Sept. 20, 1971  J. MEDNEY  3,606,403
PIPE JOINT
Filed July 2, 1969
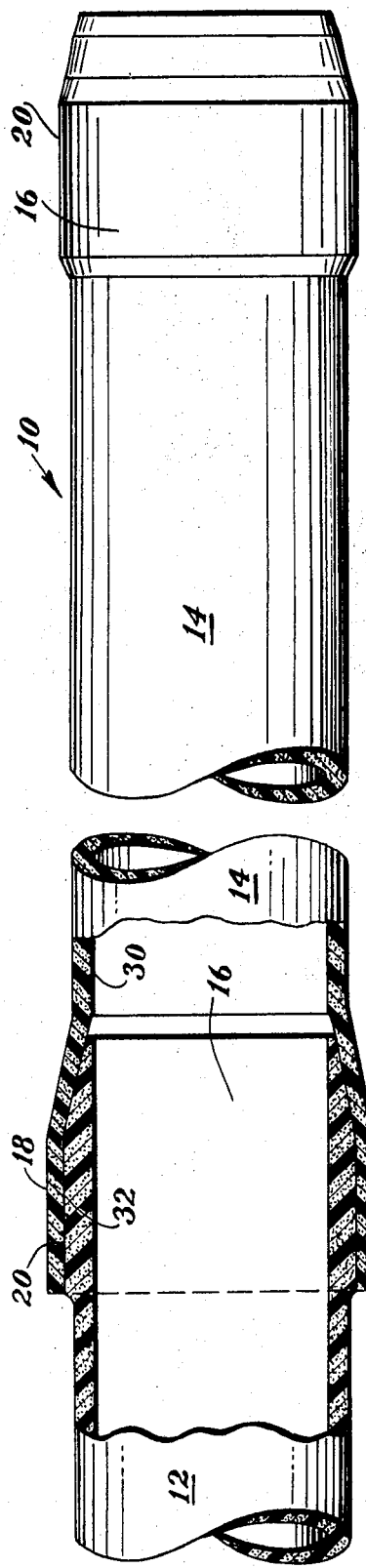
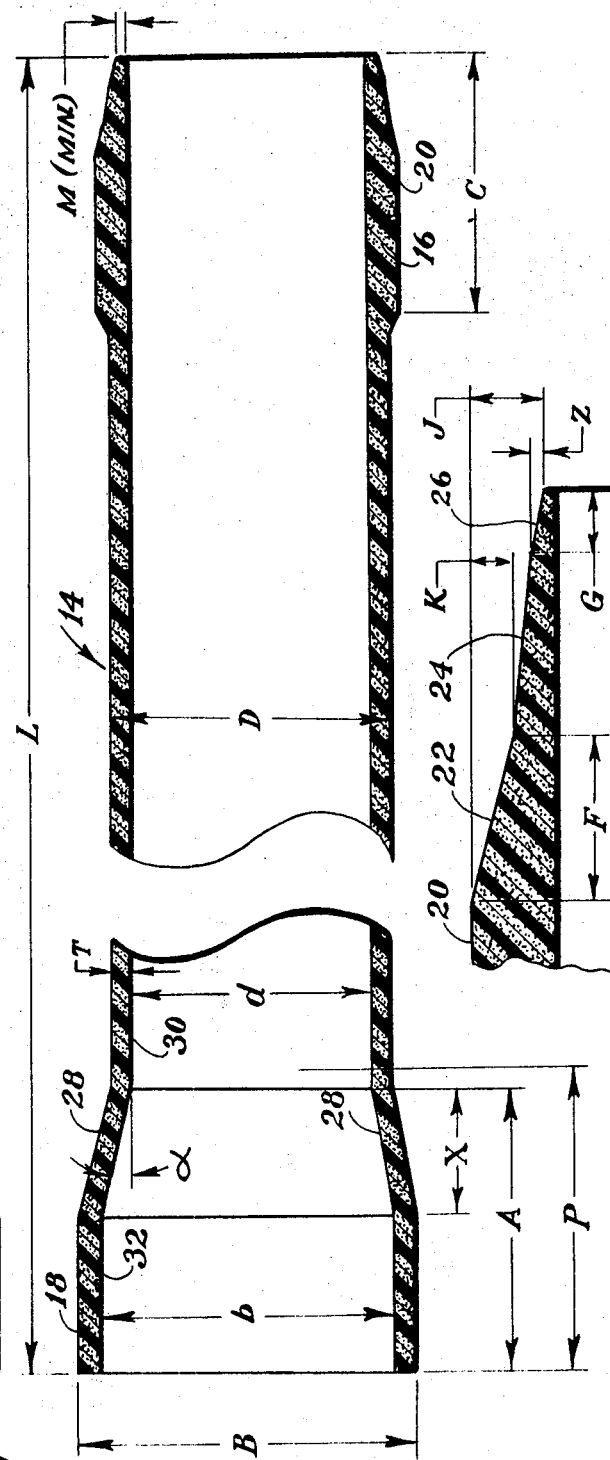
FIG.1
FIG.2
FIG.3
INVENTOR.
JONAS MEDNEY
BY Leonard H. King
ATTORNEY

United States Patent Office

3,606,403
Patented Sept. 20, 1971

3,606,403
PIPE JOINT
Jonas Medney, Oceanside, N.Y., assignor to Fiberglass Resources Corporation, Farmingdale, N.Y.
Filed July 2, 1969, Ser. No. 838,402
Int. Cl. F16l 25/00
U.S. Cl. 285—334.4    6 Claims

ABSTRACT OF THE DISCLOSURE

In a filament wound, resin reinforced pipe an improved joint is provided by means of an internal or female taper at one of each lengths and a plurality of contiguous external or male tapers at the opposite end thereof. Preferably the male tapers are three in number with the innermost one being at a greater angle than the female taper, the middle male taper being at less of an angle than the female taper and the outermost male taper being at substantially the same angle as the female taper.

---

This invention relates generally to glass filament-wound thermosetting resin tubular pipes and more particularly to an improved joint therefor.

BACKGROUND OF THE DISCLOSURE

Pipes of the type to which the present invention is directed are frequently used in outdoor installations wherein they are buried underground for the transport of various types of fluids. A continuing source of problems with underground pipes of the aforementioned type are the joints at which the pipe sections are combined. Unless the joints provide a perfect seal, leakage will occur and eventually there will be a breakdown requiring expensive excavation and repairs in the field. Many of the prior art designs provide flanges and gaskets at the pipe joints requiring that the pipe sections be bolted together. Other designs provide a very close fit approaching an interference fit between the pipe sections to provide a suitable seal.

In general, the nonflanged pipe sections are preferred because of their low cost and greater ease of assembly.

In the portion of the prior art directed to pipe joints without flanges, difficulties arose in that a sufficiently reliable seal could not easily and inexpensively be made between adjacent pipe sections. In addition, the terrain in which the pipe is set is normally irregular and the pipe must be allowed to bend slightly to follow the terrain. This bending caused undesirable stresses at the pipe joints of the prior art and resulted in leakage. In some instances because of the irregular terrain the pipe joint was unable to set properly.

Further difficulties encountered with prior art structure of this type is that as the resin "kicks" during cure, the viscosity of the resin drops and acts as a lubricant and the parts slide apart. During the mixing of the resin prior to its application to the pipe, a large quantity of air is induced therein in the form of small bubbles. Therefore, as the resin "kicks" it is actually curing. This is an exothermic reaction that gives off heat which, in turn, increases the size of the air bubbles and provides a lubricating force that helps the pipe sections to slide apart.

It has also been found that if the angle of taper of the male pipe section is greater than the taper angle of the female section, there may be a gap on one side of the pipe. That is, if when following the terrain the pipe bends downwardly, a gap will appear at the top of the pipe joint, and when the terrain follows an upward course a gap appears at the top of the pipe. The adhesive used in the prior art pipe joints did not reliably fill the resulting gap in the joints and thus there was a possibility that the air could seep in and ultimately form a leakage path. It has been found that by tapering the male pipe section at a larger angle than the female pipe section, a wedge-type lock is formed at assembly. However, with the male pipe section ground at a larger angle, the problem of forming a gap arises. Therefore, merely enlarging the male taper angle does not completely solve the problem since in the more practical field applications, the pipe very often does not remain linear and, in fact, follows the rise and fall of the terrain.

It has also been a practice in the prior art to scarf the end of the male section of pipe, and apparatus for performing this is described in U.S. Pat. No. 3,335,526, issued on Aug. 15, 1967 to Charles P. Weiss. The apparatus shown and described in this patent provided a tapered end portion for the male section of the pipe that forms a part of the joint. However, because with both this example of the prior art structure, as well as hand operations of the same type, a feather edge that could easily break down was formed on the end of the pipe section. Further, because reliance was place on the skill of an operator the taper length varied and in addition, high and low points were frequently made which not only generally gave a bad appearance, but also limited the effectiveness of the taper. The mechanical tapering of the pipe end section, either by machine or by hand, was time-consuming and therefore costly.

In order to provide for the longer taper and to provide a cylindrical section as well, a portion of the pipe of the present invention is built up during the winding operation of the male end. This built-up portion is subsequently ground to the relatively long taper without a feather edging. The construction of the present invention permits the use of a cylindrical section that is larger than the main pipe diameter and it is important because there is always some variation of wall thickness during the winding process. In order to assure that the taper seats properly, the cylindrical female section is made larger than the largest O.D. at that end. In order to assure that the pipe can always clear the pipe body, the diameter of the pipe is built up locally at the male end to provide a cylinder that is larger than the pipe body. Therefore, the mating bell is larger than the pipe body in order to provide a mating joint.

It was at first believed that the most efficient joint would be the result of a line-to-line taper, that is, the angle of the two tapered sections being identical. This practice, however, has not been found to be effective since pipes deposited in uneven terrains tend to have the sections thereof push apart because of the lubricity of the adhesive and the expansion of the air bubbles. Increasing the angle of the male taper solved some of the problems but still the uneven terrain caused voids either on the top or bottom of the mismatched tapers, the voids being as much as $\frac{1}{16}$ inch, even with close tolerance control.

Experimentation evolved the present three-phase taper on the male pipe section. There is a larger angle at the innermost portion 22 of the male taper than the female taper 28 in order to provide a lock. This is brought down approximately one-third the way of the overall taper and then the angle of the middle taper 24 is reduced to one that is lower than the angle on the mating female portion 28. The third or outermost portion 26 of the taper is one that is an identical match to the taper of the female at section 28. Thus, the present invention provides the advantage of the lock because of the high angle at the innermost portion of the taper and yet a good seal is provided at the outermost end with the middle part acting as a trap for the adhesive. Not only are the joints locked when made in accordance with the present invention but there is assurance that a big enough gap will not arise on the other end to cause problems after the adhesive sets.

The present invention overcomes the shortcomings of the prior art by providing a longer and more precise taper engagement between two mating pipe sections. The positive wedge locking provided by the present invention adds strength to the bonded joint. As will be explained more fully hereinafter, a plurality of axially consecutive tapers are formed on the male pipe section in addition to a nontapered section so that cocked joints are eliminated and the pipe sections stay locked to each other even when installed over rough terrain or in uneven ditches. There is no feather edge on the pipe end according to the present invention so that the end of the pipe is not likely to be cracked, broken or otherwise mutilated due to rough handling.

The improved pipe of the present invention is comprised of a glass filament-wound thermosetting resin tubular member in the form of a pipe having male and female end portions. Automatic filament winding techniques precisely control the wall thickness of the pipes. There are a minimum number of layers with a minimum number of filament cross-overs. Substantially the entire length of the pipe is wound with a uniform wall thickness and at strength-oriented winding angles. Close tolerances are adhered to at the male and female ends so that the pipes are ready for easy assembly without the need for any extra couplings.

Accordingly, it is a primary object of this invention to provide an improved glass fiber resin-impregnated pipe.

It is another object of this invention to provide a pipe as described above having an improved joint.

Still another object of this invention is to provide a pipe as described above wherein at least the male pipe end includes a plurality of different tapers in axial end-to-end relationship with each other.

These and other objects, features and advantages of the invention will, in part, be pointed out with particularity and will, in part, become obvious from the following more detailed description of the invention taken in conjunction with the accompanying drawing which forms an integral part thereof.

In the various figures of the drawing, like reference characters designate like parts.

BRIEF DESCRIPTION OF THE DRAWING

FIG. 1 is an assembled elevational view partly in section illustrating the joint formed by adjacent pipe sections;

FIG. 2 is a fragmentary view in longitudinal cross section illustrating a pipe comprising the present invention; and FIG. 3 is an enlarged fragmentary view in section of the male end of the pipe shown in FIG. 2.

Referring now to the drawing, there is shown a pipe assembly 10 comprising pipe sections 12 and 14. Since the pipe sections 12 and 14 are identical, it is necessary only to describe one, it being understood that each pipe section has male and female end portions 16 and 18, respectively. Further, and without expanding on well known portions of the art, it is sufficient to say that the present invention is directed to glass filament-wound pipes employing thermosetting resins as an adhesive medium. Neither the actual winding techniques nor the composition of the pipes is of primary importance and do not constitute the subject matter of the present invention.

Referring now particularly to FIGS. 2 and 3 of the drawing, it is seen that the male pipe end section 16 is comprised of a first axial section 20 that is somewhat thicker than the remainder of the wall thickness of the pipe. Section 20 has a uniform diameter throughout its length and extends into a first axially tapered section 22. A second, axially tapered section 24 is a continuation of the first tapered section and a third axially tapered section 26, which represents the end of the pipe 12, is a continuation of the second tapered section 24. This arrangement is more clearly shown in the enlarged section of FIG. 3.

To more fully appreciate the present invention, alphabetical reference characters have been applied to various portions of a typical length of pipe. This is to indicate typical sizes and relationships of dimension and is in no way intended to be limiting. Pipe diameters not listed would, of course, vary proportionately. The table of dimensions, in inches unless otherwise indicated, is as follows:

|   | 2″ diameter | 6″ diameter |
| --- | --- | --- |
| A | 6.250 | 10.406 |
| B | 2.642 | 6.991 |
| b | 2.522 | 6.795 |
| C | 3.75 | 5.70 |
| D | 2.423 | 6.675 |
| d | 2.253 | 6.429 |
| L | 250.0 | 250.0 |
| M | 0.020 | 0.068 |
| P | 6.125 | 9.812 |
| F | 1.2175 | 1.5795 |
| S | 2.502 | 6.775 |
| T | 0.060 | 0.098 |
| X | 3.406 | 6.990 |
| Z | 0.008 | 0.007 |
| K | 0.050 | 0.053 |
| J | 0.0895 | 0.0895 |
| G | 0.2525 | 0.2525 |
| Y | 2.545 | 3.229 |
| α | 1°53′ | 1°30′ |

The female end 1 of a pipe section is comprised of an axially tapered internal section 28, the ends of which terminate in a cylindrical center or main body portion 30 and a cylindrical end portion 32.

The three axial tapers 22, 24 and 26 are ground to the appropriate shape as determined by the user's requirements. The inside surface of the female end section 32 is abraded for an axial length corresponding to the dimension P. The outer surface, except for the ground male end section described above, is left in its original wound state.

A maximum joint bonding area is achieved over the length of pipe corresponding to dimension C. It will be appreciated that this construction eliminates the possibility of cocked joints and a positive wedge locking is provided by means of the long precise taper engagement. Thus, bending is prevented at the joints while leaving the pipe free to bend over the length thereof intermediate the joints so as to conform to the terrain. Further, since both the male and the female joint end sections are tapered the pipe sections are more likely to remain concentric to each other and thereby assure that there will not be a gap at either the top or the bottom when the pipe bends either up or down, respectively. The present invention also provides that the bonding adhesive will fill the gap between the outer male surface and the inner female surface and thus prevent formation of a leakage path.

It should be particularly noted that the constant angle α formed between the longitudinal axis and the interior taper at section 28 is greater than the angle of section 24, less than the angle of section 26, and substantially the same as the angle of section 22 at the male end 16 of each pipe section. This construction prevents a wedge-type friction lock and provides sufficient space about the entire confronting faces to accommodate the bonding adhesive.

There has been disclosed the best embodiment of the invention presently contemplated. However, it is to be understood that various changes and modifications may be made by those skilled in the art without departing from the spirit of the invention.

What I claim as new and desire to secure by Letters Patent is:

1. An improved resin-bonded glass filament pipe comprising:

(a) a male section at one end of said pipe, said male section having an inwardly tapered end portion defined by three differently tapered, contiguous sections including an innermost, middle and outermost section, and a cylindrical portion connecting said tapered portion and the remainder of said pipe, said cylindrical portion of said male section being of larger diameter than the remainder of said pipe; and (b) a female section at the other end of said pipe, said female section having a cylindrical portion of larger diameter than the remainder of said pipe and an outwardly tapered portion connecting said cylindrical portion and the remainder of said pipe, said female tapered portion being at an angle greater than the angle of said middle one of said male tapered sections, the inside diameter of said cylindrical portion of female section being greater than the outside diameter of said cylindrical portions of said male section.

2. The pipe in accordance with claim 1 wherein the interior of said female tapered and cylindrical section is abraded.

3. The pipe in accordance with claim 1 wherein the extreme end of said male section is not feathered.

4. The pipe in accordance with claim 1 wherein the exterior of said pipe, except for said cylindrical and tapered male portions, is left in the "as wound" condition and said cylindrical and tapered male portions are ground to said respective configurations.

5. The pipe in accordance with claim 1 wherein the angle of the innermost one of said three male sections is greater than the angle of the mating taper on the female end of said pipe and the angle of the outermost one of said three male sections is substantially the same as the angle of the mating taper on the female end of said pipe.

6. The pipe in accordance with claim 5 wherein the innermost one of said three tapers extends over a length approximately one-third of the entire taper.

References Cited

UNITED STATES PATENTS

| | | | |
|---|---|---|---|
| 1,132,137 | 3/1915 | Weston | 285—332.4X |
| 1,998,633 | 4/1935 | Nichols | 285—332X |
| 2,998,269 | 8/1961 | Houghton | 285—260 |
| 3,362,731 | 1/1968 | Gasche et al. | 285—334.4X |
| 3,388,932 | 6/1968 | Bradley | 285—332X |

FOREIGN PATENTS

| | | | |
|---|---|---|---|
| 467,931 | 6/1937 | Great Britain | 285—332 |

DAVE W. AROLA, Primary Examiner

U.S. Cl. X.R.

138—118; 285—423